(12) United States Patent
Wang et al.

(10) Patent No.: US 12,265,803 B2
(45) Date of Patent: Apr. 1, 2025

(54) AUTOMATIC IMPROVEMENT OF SOFTWARE APPLICATIONS

(71) Applicant: Intuit Inc., Mountain View, CA (US)

(72) Inventors: Xiaowen Wang, Mountain View, CA (US); Cheuk Yu Tsang, Hayward, CA (US); Jonathan Seppi, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 841 days.

(21) Appl. No.: 17/388,180

(22) Filed: Jul. 29, 2021

(65) Prior Publication Data

US 2023/0033753 A1 Feb. 2, 2023

(51) Int. Cl.
G06F 8/38 (2018.01)
G06F 3/0481 (2022.01)
G06F 16/28 (2019.01)
G06Q 10/0639 (2023.01)
G06Q 30/0201 (2023.01)
G06Q 30/0204 (2023.01)

(52) U.S. Cl.
CPC .............. *G06F 8/38* (2013.01); *G06F 3/0481* (2013.01); *G06F 16/285* (2019.01); *G06Q 30/0201* (2013.01); *G06Q 30/0204* (2013.01); *G06Q 10/06395* (2013.01)

(58) Field of Classification Search
None
See application file for complete search history.

(56) References Cited

U.S. PATENT DOCUMENTS 9,864,493 B2 * 1/2018 Sun .................. G06Q 10/10
2017/0316122 A1 * 11/2017 Xu .................... G06F 11/3672
2019/0056917 A1 * 2/2019 Bernal ................ G06N 20/00
(Continued)

FOREIGN PATENT DOCUMENTS

WO WO-2017037445 A1 * 3/2017 .......... G06F 11/3024
WO WO-2018132840 A1 * 7/2018 ............. G06F 40/30

OTHER PUBLICATIONS

Yang et al., Modeling the Number of Active Software Users (Year: 2011).*

(Continued)

*Primary Examiner* — Mohamed N El-Bathy
(74) *Attorney, Agent, or Firm* — Lathrop GPM LLP

(57) ABSTRACT

A computer-implemented method including tracking data describing a new population of users of a software application including different graphical user interfaces (GUIs). The method also includes generating a distribution by mapping the data to lookalike cohorts. The method also includes extracting, using a random sampling algorithm, samples from the distribution. The method also includes generating, from the samples, a normal distribution of predicted long term values of the new population of users. The method also includes selecting an expected long term value from the normal distribution. The method also includes generating, from the normal distribution, an estimated distribution, around the expected long term value, of estimated long-term values for the new population. The method also includes selecting, using the expected long term value and the estimated distribution, a selected GUI from among the different GUIs. The method also includes modifying the software application by presenting the selected GUI.

18 Claims, 8 Drawing Sheets

(56) References Cited

U.S. PATENT DOCUMENTS

2019/0114059 A1* 4/2019 Chakra .................. G06F 9/451
2019/0347675 A1* 11/2019 Yang ...................... A63F 13/60
2021/0342247 A1* 11/2021 Ciolek ................... G06F 40/14

OTHER PUBLICATIONS

Krause et al., Supporting Iterative Cohort Construction with Visual Temporal Queries (Year: 2015).*
Tran, J., "Revenue Analysis: A Bayesian Approach", https://medium.com/@jireh/revenue-analysis-a-bayesian-approach-867b, Jan. 5, 2018, 8 pages.
Fader, P. S. et al., "How to Project Customer Retention", Wiley InterScience, Journal of Interactive Marketing, Oct. 1, 2007, 15 pages.

* cited by examiner

⟋— 500

| New Population of Users: | 150 |
|---|---|
|  |  |
| Lookalike Cohort 1 | 20 |
| Lookalike Cohort 2 | 40 |
| Lookalike Cohort 3 | 90 |

| Sample # | Prob. Cohort 1 | Prob. Cohort 2 | Prob. Cohort 3 |
|---|---|---|---|
| Sample 1 | 0.13546494 | 0.31278485 | 0.55175021 |
| Sample 2 | 0.10692273 | 0.31747916 | 0.5755981 |
| Sample 3 | 0.12470742 | 0.28988034 | 0.58541224 |
| Sample 4 | 0.10489884 | 0.30692951 | 0.58817164 |
| Sample 5 | 0.13348873 | 0.33129589 | 0.53521539 |

*FIG. 5B*

AUTOMATIC IMPROVEMENT OF SOFTWARE APPLICATIONS

BACKGROUND

While improvements to software applications are often desirable, implementing improvements to software applications can be a time consuming, expensive, unpredictable, and difficult process. As a specific example, a software company desires to improve a software application in order to increase the utility of the software application. In particular, improvements to the graphical user interfaces of the software application are proposed. A team of software engineers may propose multiple different sets of graphical user interfaces, each of which is tailored to improve the utility of the software application. A technical challenge exists in automatically selecting which particular set of graphical user interfaces should be deployed to improve the software application.

SUMMARY

The one or more embodiments provide for a computer-implemented method. The computer-implemented method includes tracking data describing a new population of users of a software application including different graphical user interfaces (GUIs). The method also includes generating a distribution by mapping the data to lookalike cohorts. The method also includes extracting, using a random sampling algorithm, samples from the distribution. The method also includes generating, from the samples, a normal distribution of predicted long term values of the new population of users. The method also includes selecting an expected long term value from the normal distribution. The method also includes generating, from the normal distribution, an estimated distribution, around the expected long term value, of estimated long-term values for the new population. The method also includes selecting, using the expected long term value and the estimated distribution, a selected GUI from among the different GUIs. The method also includes modifying the software application by presenting the selected GUI.

The one or more embodiments also provide for a system. The system includes a server having a processor. The system also includes a software application including different graphical user interfaces (GUIs). The system also includes a non-transitory computer readable storage medium in communication with the processor. The non-transitory computer readable storage medium stores a random sampling algorithm, computer readable program code, and data describing a new population of users of the software application. The non-transitory computer readable storage medium also stores a distribution including the new population of users distributed into lookalike cohorts. The non-transitory computer readable storage medium also stores samples drawn from the distribution and a normal distribution of predicted long term values of the new population of users. The non-transitory computer readable storage medium also stores an expected long term value and an estimated distribution, of estimated long-term values for the new population of users, around the expected long term value. The non-transitory computer readable storage medium also stores a selected GUI in the different GUIs.

The system also includes a long term value generator configured, when executed by the processor, to generate the distribution by mapping the data to the lookalike cohorts. The long term value generator is also configured to extract, using the random sampling algorithm, the samples from the distribution. The long term value generator is also configured to generate, from the samples, the normal distribution of predicted long term values. The long term value generator is also configured to select the expected long term value from the normal distribution. The long term value generator is also configured to generate, from the normal distribution, the estimated distribution around the expected long term value. The system also includes a user interface selector configured, when executed by the processor, to select, using the expected long term value and the estimated distribution, the selected GUI. The user interface selector is also configured to modify the software application by presenting the selected GUI.

The one or more embodiments also provide for a non-transitory computer readable storage medium storing computer readable program code which, when executed by a processor, performs computer-implemented method. The computer-implemented method includes tracking a new population of users of a software application including different graphical user interfaces (GUIs). The computer-implemented method also includes generating a distribution by mapping the new population of users to lookalike cohorts. The computer-implemented method also includes extracting, using a random sampling algorithm, samples from the distribution. The computer-implemented method also includes generating, from the samples, a normal distribution of predicted long term values of the new population of users. The computer-implemented method also includes selecting an expected long term value from the normal distribution. The computer-implemented method also includes generating, from the normal distribution, an estimated distribution, around the expected long term value, of estimated long-term values for the new population. The computer-implemented method also includes selecting, using the expected long term value and the estimated distribution, a selected GUI from among the different GUIs. The computer-implemented method also includes modifying the software application by presenting the selected GUI.

Other aspects of the one or more embodiments will be apparent from the following description and the appended claims.

BRIEF DESCRIPTION OF DRAWINGS

FIG. 5A, FIG. 5B, FIG. 5C, and FIG. 5D show additional examples of using the methods of FIG. 2 and FIG. 3, as applied to the example shown in FIG. 4, in accordance with one or more embodiments.

DETAILED DESCRIPTION

Figure 1:
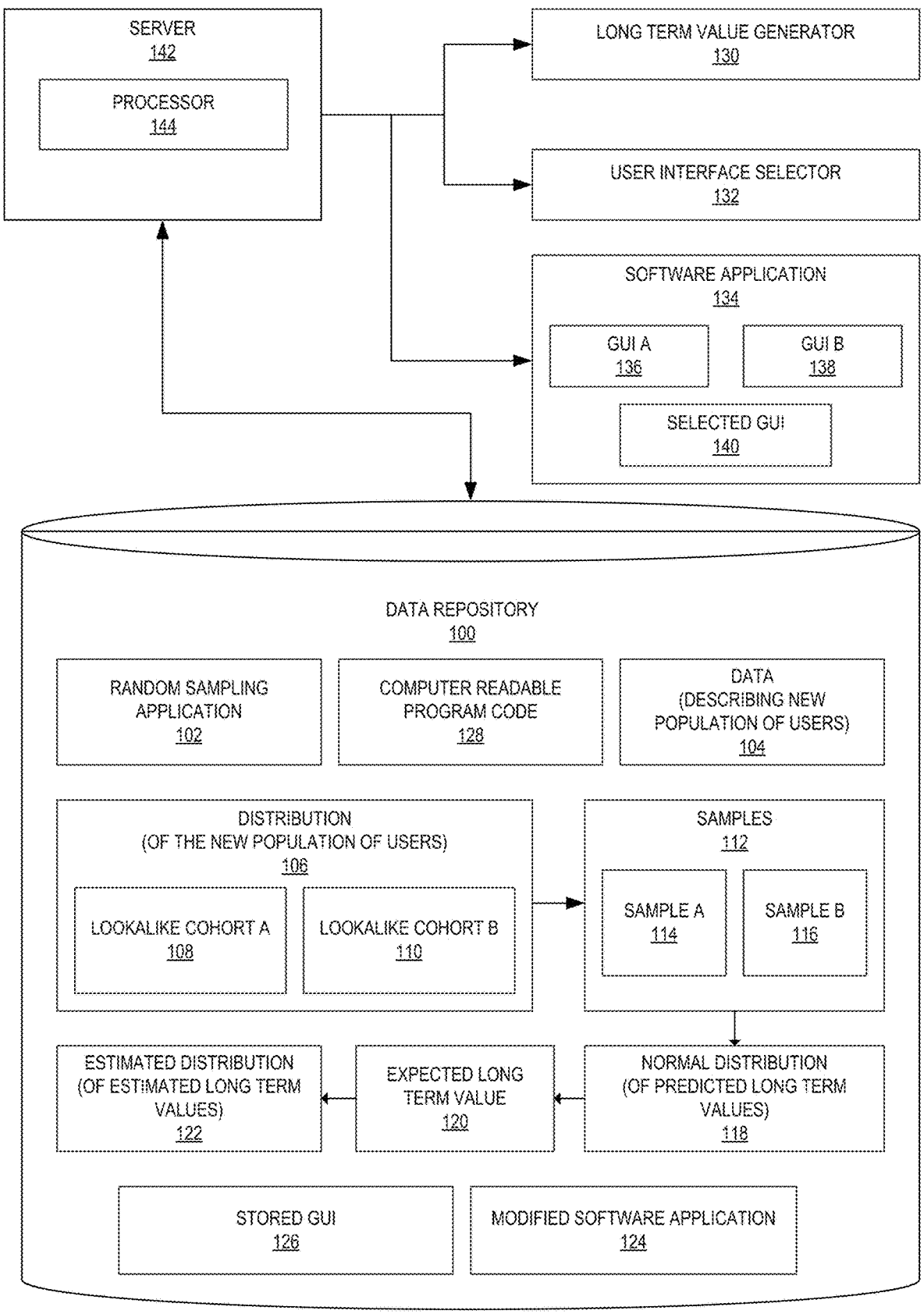
FIG. 1 shows a computing system, in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

In general, the one or more embodiments related to automatically modifying software applications using automatically collected user data. Modification of the software programs can take the form of selecting different graphical user interfaces (GUIs) to users to make the software easier to use and/or more appealing, modifying functionality of the software, or other modifications.

One existing method of modifying software is to perform A/B testing, and then selecting versions of the software based on the results of the A/B testing. A/B testing, also known as bucket testing or split-run testing, is a user experience research methodology. Two variants of the software are presented: "A" and "B." A two-sample statistical hypothesis testing method is applied to compare the two versions to a single variable, typically by testing a user's response to variant "A" against variant "B." A statistical determination of which of the two variants is more effective is made, and then the software application is modified accordingly.

A technical challenge faced in using A/B testing to automatically modify a software application is that the two different versions of the software may have multiple variables changing, such as when there are multiple aspects of the software being changed concurrently. Concurrent multiple changes may be desirable to save time in modifying software, but increase the difficulty of obtaining a valid statistical measurement.

Another, related, technical challenge is that the speed of A/B testing may be slow compared to the rate at which updates for the application are desired or required. An automatic updating process (or a software engineer or company manager) may be faced with trying to determine which version of the software to use after a relatively short testing duration period when long term value determinations are only estimated. The term "relatively short testing duration" is determined relative to the time used to obtain statistically valid long term values for new users of the application.

A long term value is a mathematical measure of success of a software application. For example, a long term value may be a statistical probability that a new user will continue using the software after a pre-defined period of time. The pre-defined period is the "long" term and the length of the pre-defined period may be dependent on the type of software application. For example, long term may be three months for some software applications (e.g., personal health management applications) and three or more years for other software applications (e.g., financial management applications). In another example, a long term value may be sales of the software application. Many other examples of long term values exist. In any case, the software company desires to automatically update the software being sold in a manner that increases long term values.

In other words, the company seeks changes to the software that increases the likelihood that future new users will have higher long term values. Automatic updates to the software are useful, as automatic updates are faster than manual updates. However, A/B testing can take an undesirable amount of time to generate statistically relevant long term values. Thus, another technical challenge exists with respect to maximizing the speed of automatically determining a selected software change that maximizes a predicted long term value of an update to the software, and then automatically updating the software accordingly.

The one or more embodiments are directed towards addressing the above-described technical challenges. The one or more embodiments automatically track use of software versions by a new population of users, compare the new population of users to an existing population of users that have known (i.e., statistically relevant) long term values, and then apply an A/B testing statistical analysis to predicted estimated distributions of long term values for the new population of users. As a result, a quantitative estimation of long term values for the new users supports the more rapid automatic selection of an update to the software application. Because the automatic selection is made with reference to an existing set of users, the speed of generation of statistically significant long term values for the new population is substantially increased. As a result, automated software updates that are quantitatively more likely to generate higher long term values, relative to other proposed updates, can be performed more quickly.

Attention is now turned to the figures. FIG. 1 shows a computing system, in accordance with one or more embodiments. The computing system includes a data repository (100). In one or more embodiments, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores a random sampling application (102). The random sampling application (102) is an application that is programmed to take one or more random samples from a distribution and to store the one or more samples in a data structure, such as an array. An example of the random sampling application (102) is a Monte Carlo simulation algorithm. Another example of the random sampling application (102) is a Markov chain Monte Carlo (MCMC) algorithm. Other random sampling algorithms include probability sampling algorithms such as simple random sampling, clustered sampling, systemic sampling, and stratified random sampling. Still other sampling algorithms may be used for the random sampling application (102).

The random sampling application (102) also stores data (104). The data (104) describes a new population of users of a software application (134). The term "new population of users" is defined below. The data (104) is automatically tracked or generated, as described with respect to FIG. 2. The data (104) may include information such as user preference, at least retention data (i.e., how long a user uses the software application (134)), time of use of the software application (134), information regarding use of different GUIs of the software application, and possibly many other forms of data automatically collected while the new population of users use one or more versions of the software application (134)). The term "at least retention data" also includes the possibility of further using actual retention data as the data (104) for the new population of users, as testing and development may be ongoing. The data (104) takes the form of a data structure suitable for consumption and use by a computer.

As indicated above, the data (104) describes a new population of users. A new population of users is a set of users of a software program who have been using the software application for less than a pre-defined period of time. A new population of users is contrasted with an existing population of users. An existing population of users is a set of users of the software program who have been using the software application for the pre-defined period of time or longer. The period of time is related the time used to acquire a long term value that has a pre-defined degree of statistical accuracy. Again, as defined above, a long term value is a mathematical measure of success of a software application. A new population of users do not have long term values having the pre-defined degree of statistical accuracy. An existing population of users do have long term values having the pre-defined degree of statistical accuracy. A new population of users may also be defined as those users who do not have long term values having the pre-defined degree of statistical accuracy, regardless of the length of time of use of the software application. Likewise, an existing population of users may also be defined as those users who do have long term values having the pre-defined degree of statistical accuracy, regardless of the length of time of use of the software application.

The data repository (100) also stores a distribution (106). The distribution (106) is a distribution of the new population of users into two or more lookalike cohorts. An example of the distribution (106) is shown in FIG. 5A. The distribution (106) is generated by mapping the data (104) to the lookalike cohorts, such as the lookalike cohort A (108) and the lookalike cohort B (110) shown in FIG. 1.

In the one or more embodiments, existing users are divided into groups known as existing cohorts. The existing users are divided into the existing cohorts based on features associated with the existing users. A feature is an item of information associated with a data object. For example, features of a user may be: A user identification, a time the user has used the software application, a number of login attempts, the number of software functionalities utilized by the user, an age of a user, etc. Existing users with features having a pre-defined statistical degree of similarity are assigned to a common existing cohort.

A lookalike cohort, such as the lookalike cohort A (108) and the lookalike cohort B (110), is a grouping of the new population of users of the software application (134) as related to one or more of the existing cohorts. In particular, each subset (i.e. lookalike cohort of the new population) is mapped to an existing group of users (i.e., an existing cohort of the existing population) based on statistically similar features.

Figure 2:
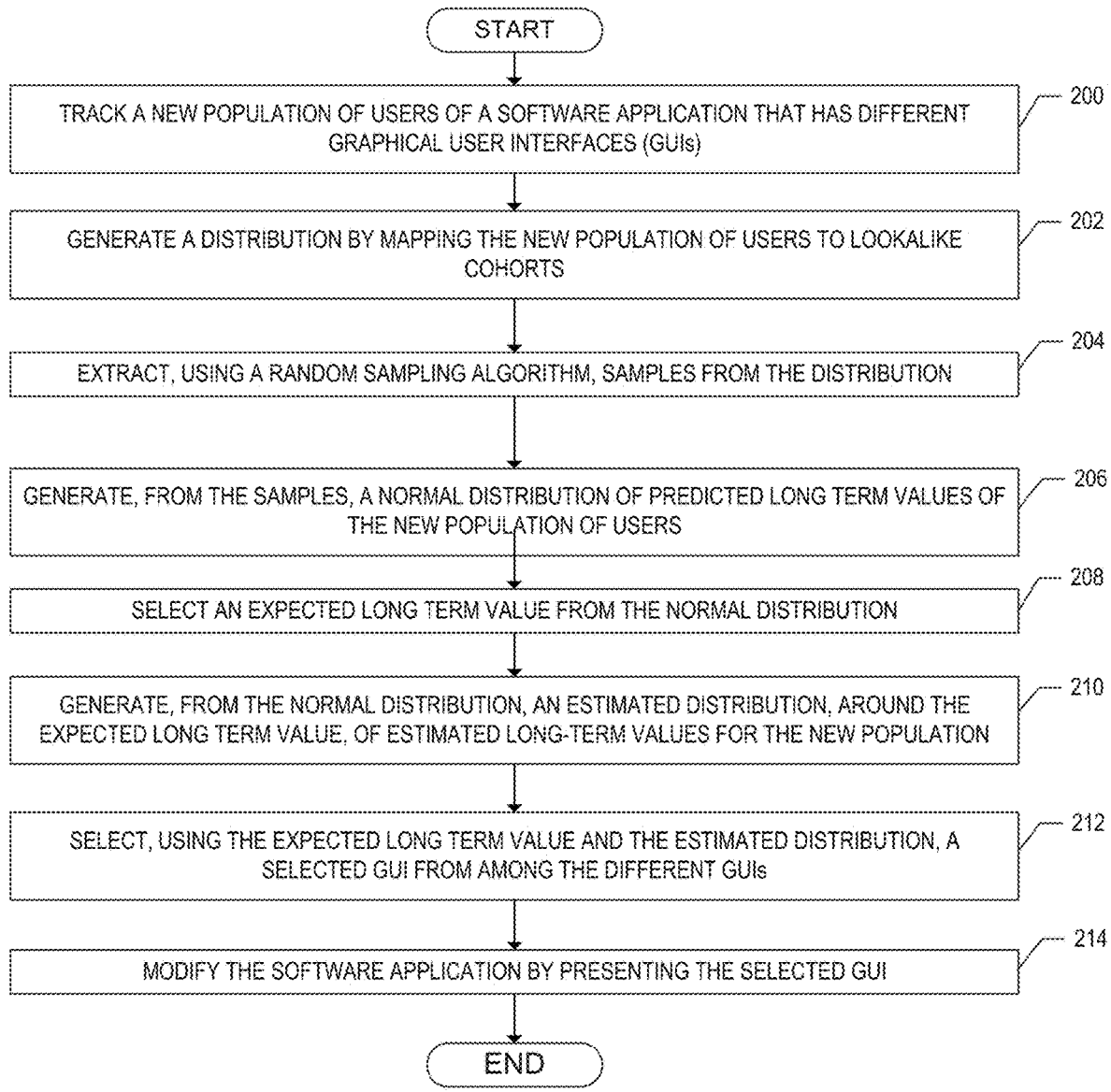
FIG. 2 and FIG. 3 show flowcharts of methods for modifying a software application, in accordance with one or more embodiments.

The mapping is performed in a manner described with respect to FIG. 2. Briefly, the features of the lookalike cohort are comparable to the features of the existing cohorts, and the new users are sorted by their features into the lookalike cohorts accordingly. "Comparable to" means that one feature is within a pre-determined mathematical range of another feature. By sorting the new users of the software application (134) into lookalike cohorts, the proposed update can be evaluated more quickly by comparing the new users, for whom long term values are not statistically accurate to a desired degree, to existing users that have well-established long term values.

The data repository (100) also stores samples (112). The samples (112), such as sample A (114) and sample B (116), are sets of probabilities that a selected user in the new population will be a member of a selected one of the lookalike cohorts, as explained with respect to step 204 of FIG. 2. Each sample is drawn using a sampling method, as described with respect to FIG. 2. Use of the samples (112) is also described with respect to FIG. 2. An example of samples is shown in FIG. 5B.

The data repository (100) also stores a normal distribution (118). The normal distribution (118) is a statistically normal distribution of predicted long term values that apply to the new population of users of the software application (134). Generation of the normal distribution (118) is described with respect to FIG. 2. An example of the normal distribution (118) is shown in FIG. 5D.

The data repository (100) also stores an expected long term value (120) with an accompanying estimated distribution (122). The expected long term value (120) is the value of the peak of the normal distribution (118). An example of the expected long term value (120) is shown in FIG. 5D. The estimated distribution (122) is a statistical probability that the "true" long term value for the new population of users of the software application (134) lies above or below the expected long term value (120). An example of the estimated distribution (122) is also shown in FIG. 5D.

The data repository (100) also stores a modified software application (124). The modified software application (124) is the software application (134), though modified in some manner based on the proposed change to the software application (134) that has been tested using the method of FIG. 2, in accordance with the results of the expected long term value (120) and/or the estimated distribution (122).

The modified software application (124) may be referred-to as a "presented" software application. The term "present" in the context of the one or more embodiments refers to storing a change to the software application (134) (i.e., the modified software application (124)), showing a change of a GUI to a user, implementing new functionality to the software application, and the like. Thus, an example of presenting the modified software application (124) may be to store a new GUI in the form of a stored GUI (126). The stored GUI (126) can then be shown to a user or stored for future use.

The data repository (100) also stores computer readable program code (128). The computer readable program code (128) is computer code which, when executed by a processor (e.g., the processor (144) described below) performs the methods described herein, such as the methods of FIG. 2 and FIG. 3. In other words, the computer readable program code (128) is one or more machine-readable embodiments of the algorithms described with respect to FIG. 2 and FIG. 3. Because the data repository (100) may take the form of a non-transitory computer readable storage medium, the computer readable program code (128) may be embodied in a non-transitory computer readable storage medium.

The system shown in FIG. 1 also includes other components. For example, the system includes a long term value generator (130). The long term value generator (130) is a software application that, when executed, is configured to generate a long term value. The algorithm for the long term value generator (130) is shown with respect to the steps described with respect to FIG. 2, and in particular with respect to step 202 through step 210.

The system shown in FIG. 1 also includes a user interface selector (132). The user interface selector (132) is a software application that, when executed, is configured to select a user interface for the software application (134). Selection of the user interface will form the modified software application (124). The algorithm for the user interface selector (132) is shown with respect to the steps described with respect to FIG. 2, and in particular with respect to step 212 and step 214.

The system shown in FIG. 1 also includes the software application (134). The software application (134) is the software application that is to be modified automatically. The software application (134) is the program that is being used by the new population of users and/or the existing population of users. Thus, the software application (134) is the subject of A/B testing and the methods described herein in order to generate the modified software application (124).

In a specific example, the software application (134) may have multiple GUIs, such as GUI A (136) and GUI B (138). The one or more embodiments, as described with respect to FIG. 2 or FIG. 3, may be used to perform A/B testing to estimate the long term values of selection of the GUI A (136) versus the GUI B (138). The GUI with the more favorable long term value is selected as the selected GUI (140). The selected GUI (140) is then implemented automatically, transforming the software application (134) into the modified software application (124).

The term "more favorable long term value" refers to a quality measure comparison. The quality measure comparison may refer to the highest estimated long term value (e.g., expected long term value (120)) for a given GUI or functionality of the software application (134). However, the quality measure comparison may be evaluated in some other manner, such as for example selecting a lower estimated long term value for a given GUI or functionality, but which has a lower variance in the estimated distribution (122). In other words, the "more favorable long term value" may be the most accurate estimated long term value, as opposed to simply the greatest expected long term value. Furthermore, weights or other algorithms could be applied to the expected long term value (120) and/or the estimated distribution (122) in order to determine the "more favorable long term value." Nevertheless, the "more favorable long term value" is the long term value for a given GUI, functionality, or other tested software application change that is predicted to have the more desirable long term value.

The system shown in FIG. 1 also includes a server (142). The server (142) is one or more computers, possibly arranged in a distributed computing environment. The server (142) includes one or more processors, such as the processor (144) shown in FIG. 1. The server (142) and the processor (144) execute the computer readable program code (128) to perform the methods described herein, such as with respect to the methods shown in FIG. 2 and FIG. 3. Examples of the server (142) and/or the processor (144) are described further with respect to FIG. 6A and FIG. 6B.

While FIG. 1 shows a configuration of components, other configurations may be used without departing from the scope of the one or more embodiments. For example, various components may be combined to create a single component. As another example, the functionality performed by a single component may be performed by two or more components.

Figure 3:
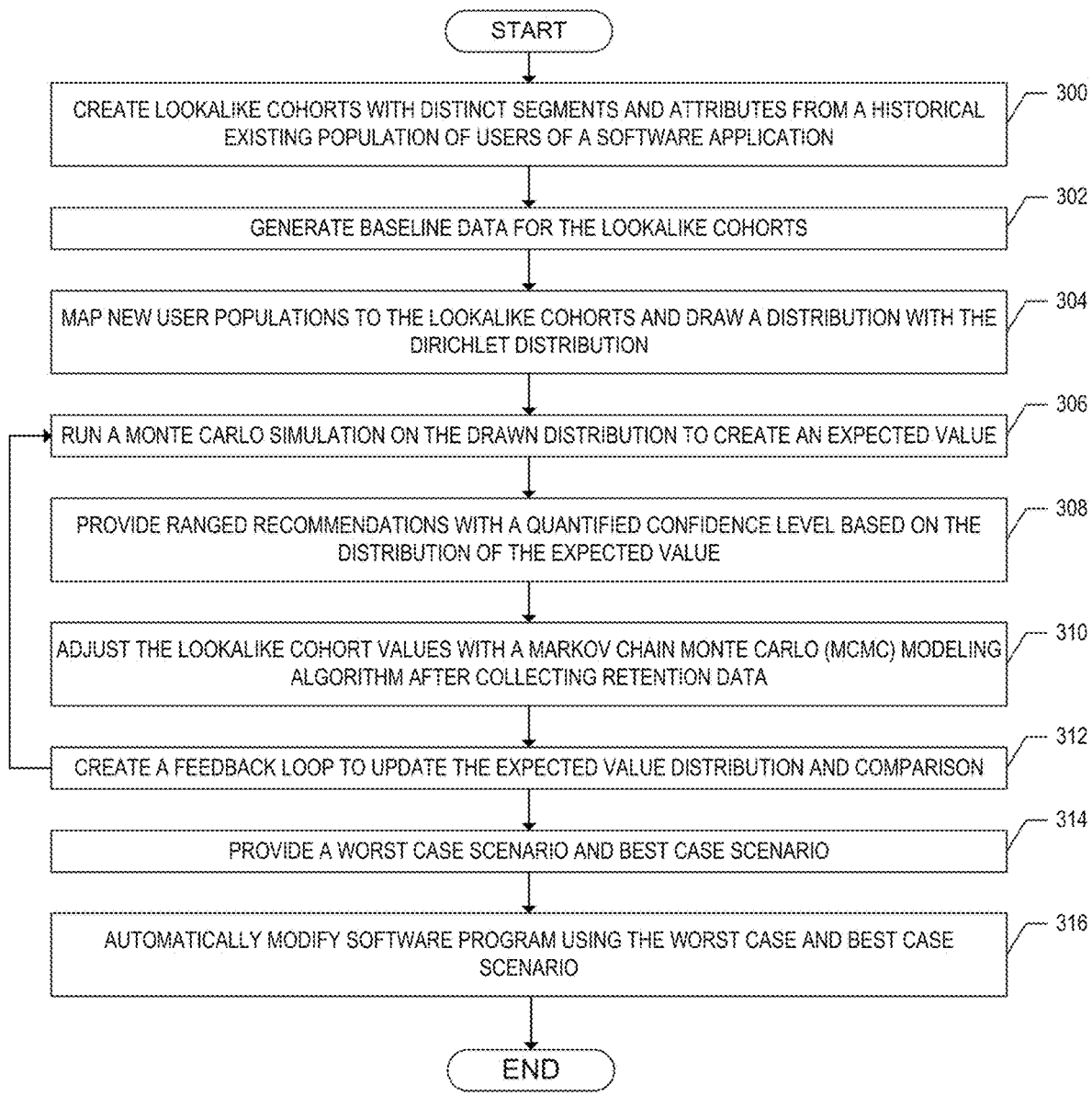

FIG. 2 and FIG. 3 show flowcharts of methods for modifying a software application, in accordance with one or more embodiments. The methods of FIG. 2 and FIG. 3 may be embodied as computer readable program code that is executed using the system shown in FIG. 1. Thus terms used with respect to FIG. 2 and FIG. 3 are defined with respect to FIG. 1. The methods of FIG. 2 and FIG. 3 may be characterized as methods of automatically updating software. The methods of FIG. 2 and FIG. 3 may also be generalized to other software-related applications of estimating long term values in AB testing, such as evaluating the look and feel of widgets of a GUI, evaluating software functionality, and many other functions. Thus, the examples of FIG. 2 and FIG. 3 do not necessarily limit the one or more embodiments.

Attention is first turned to FIG. 2. FIG. 2 may be characterized as a method of automatically modifying software by automatically presenting or selecting a selected GUI from among multiple GUIs.

Step 200 includes tracking data describing a new population of users of a software application that has different graphical user interfaces (GUIs). Tracking data may be performed by recording actions taken by the new population of users with respect to the software application. Tracking the new population of users at step 200 may be performed by a background daemon tracking and recording actions of a using a graphical user interface (GUI), whereby the users may be determined to be in the new population of users. The background daemon may gather GUI usage data generated by the new population of users. Other examples of tracking data may include tracking login times and durations, how long a user continues to use the software application over a period of time regardless of the number of logins, how long a user continues to pay for the software application, levels of access of the users, user feedback, software-specific information (i.e. information relating to how users use specific aspects of the software functionalities), user demographic information, user location information, user account information, and possibly many other types of information.

The one or more embodiments may include tracking data regarding one or more GUIs of the software application, and then modifying the GUIs according the methods described herein. However, the one or more embodiments are not necessarily limited to GUI related tracking and software modification. For example, the one or more embodiments could be used to track data related to functionality of the software application, and then to automatically modify the functionality of the software application.

Step 202 includes generating a distribution by mapping the data to lookalike cohorts. As mentioned above in FIG. 1, the lookalike cohorts are groups of new users that are comparable to groups of long term populations of users of the software application. The groups of long term users have known long term values, and so an assumption is made that the related lookalike cohorts will have similar long term values. In the example of FIG. 2, the groups long term populations of users have stored long term values of data (e.g., GUI usage data) of the software application.

The mapping of the data to the lookalike cohorts is performed using features in the data tracked at step 200. The features reflect information about the new population of users. The features are compared to similar features previously tracked for existing users of the software application. The existing users have known long term values.

When the new features of the new population of users are compared to the existing features of the existing population of users, similar features can be found. The new users can be grouped with existing users on the basis that the new users have new features that are comparable to the existing features of the existing users. The term "comparable to," in the context of comparing features, means that a threshold number of the new features for a new user are within a pre-defined range of similarity of the similar features of an existing user having a known long term value. The term "similar" means that a feature of a new user is within a pre-defined numerical range of a corresponding feature of an existing user.

Thus, for example, if a given new user is determined to be comparable to a given existing user, then the given new user is placed in a selected lookalike cohort associated with the existing user. The selected lookalike cohort is comparable to a pre-defined existing cohort in which the existing user is placed. The pre-defined existing cohort has a known long term value. Thus, the lookalike cohort will have a similar long term value as the long term value associated with the existing cohort. An example of assigning new users to lookalike cohorts is shown with respect to FIG. 5A.

The similarities between features may be found via the application of rules (i.e. direct comparison of features) or via the application of machine learning (i.e. indirect comparison of features). For example, an unsupervised machine learning model, like a neural network, could be used to identify patterns in the features in order to match new users to existing users. In this case, the machine learning model is trained using the existing features of the existing users. Then, the input to the trained machine learning model is a vector formed from the features of the new users. A vector is a data structure that stores information in a one-dimensional array. After execution of the machine learning model, the output of the trained machine learning model is a vector of probabilities. The probabilities reflect likelihoods that new users are associated with the existing users.

Based on the highest probabilities, the new users are sorted into the lookalike cohorts using a rule-based procedure that takes as input the output of the trained machine learning model. For example, if a new user is most likely associated with existing cohort A, then the new user is assigned to lookalike cohort X, where lookalike cohort X is assigned a long term value similar to that of existing cohort A. Again, an example of sorting new users into lookalike cohorts is shown in FIG. 5A.

Step 204 includes extracting, using a random sampling algorithm, samples from the distribution. As defined above with respect to FIG. 1, the samples are probabilities that a selected user in the new population is a member of a selected one of the lookalike cohorts. A sample is extracted by picking a number of new users from the set of new users, and then examining into which lookalike cohorts the new users belong. A probability can then be determined that a future selection of a new user belongs to one of the lookalike cohorts. The probability is determined by referring to the number of users within a sample that fall within a given cohort, relative to the total number of users selected for a given sample. The process is repeated to generate multiple samples. Ultimately, a two-dimensional table of probabilities is generated, taking the form of rows of samples, wherein each sample is a set of probabilities (one per lookalike cohort) that a randomly selected user will fall into the corresponding lookalike cohort. An example of extracting the samples, and the table of probabilities, is shown with respect to FIG. 5B.

Step 206 includes generating, from the samples, a normal distribution of predicted long term values of the new population of users. The normal distribution is generated by recording the assumed long term values for each of the lookalike cohorts of the extracted samples. Because a sufficiently large number of random samples has been extracted, the distribution of the samples will be approximately normal. The term "normal" means that the variance of long term values will follow a predictable curve known in the field of mathematics as a "normal distribution." An example of the normal distribution of predicted long term values is shown in FIG. 5C.

Step 208 includes selecting an expected long term value from the normal distribution. The expected long term value is the number associated with the peak of the normal distribution generated at step 208. Thus, selecting the expected long term value means that the number associated with the peak of the normal distribution is selected and recorded as the expected long term value. Thus, for example, the maximum value shown at the peak of the curve in FIG. 5D may be selected and recorded as the expected long term value.

Step 210 includes generating, from the normal distribution, an estimated distribution, around the expected long term value, of estimated long-term values for the new population. The estimated distribution is generated by statistically analyzing the normal distribution generated at step 206 against a control group. In particular, the estimated distribution is generated by comparing the normal distribution at step 206 to a known control distribution of long term values of existing users of the unmodified version of the software application. The comparison between the normal distribution and the control distribution generates another curve that shows the possible predicted increases or decreases in long term values predicted for the new version of the software being tested, relative to the existing version of the software. The estimated distribution of estimated long term values for the new population is the range of long term values within a pre-defined number of standard deviations around the expected long term value.

Figure 5C:
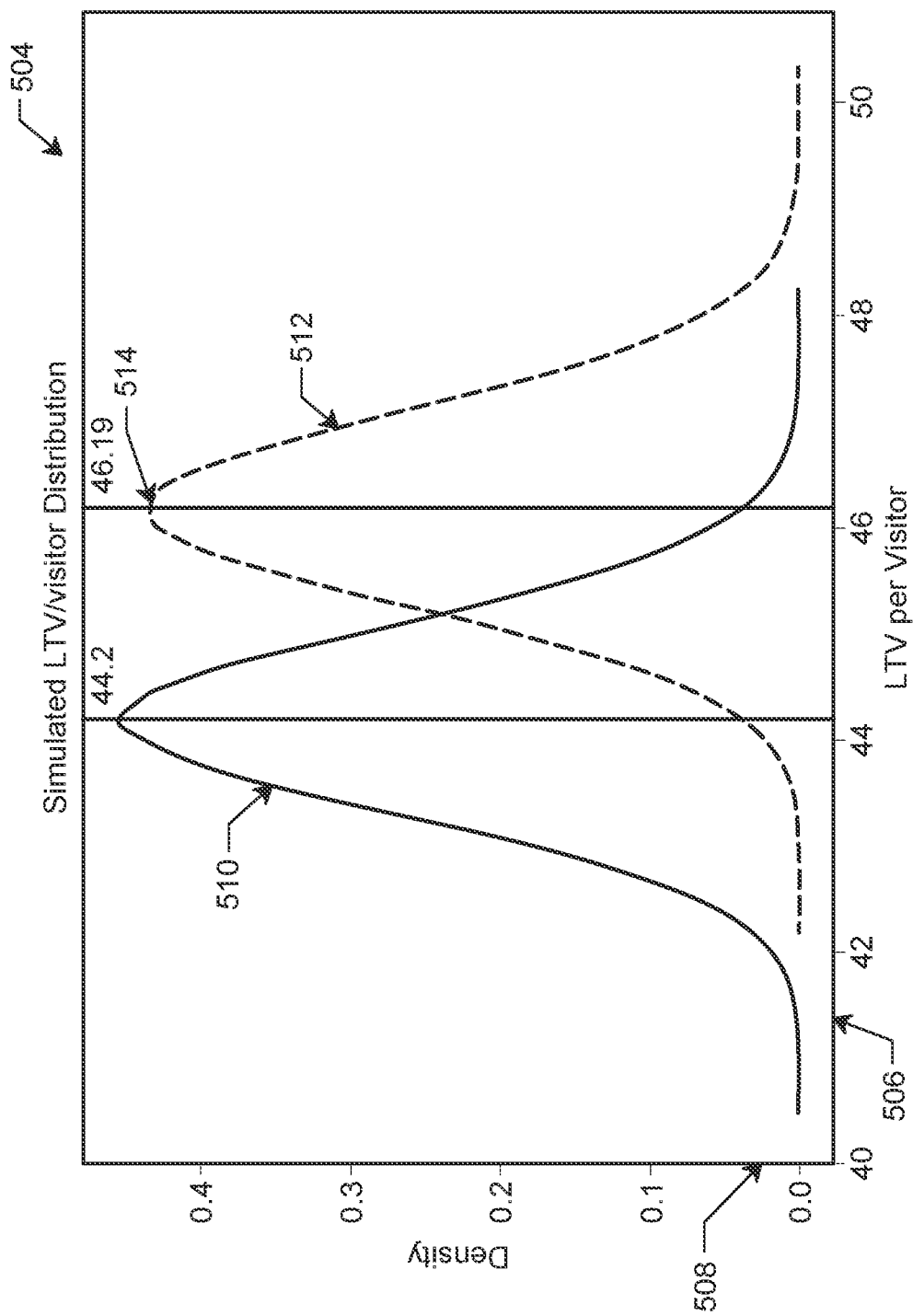
Figure 5D:
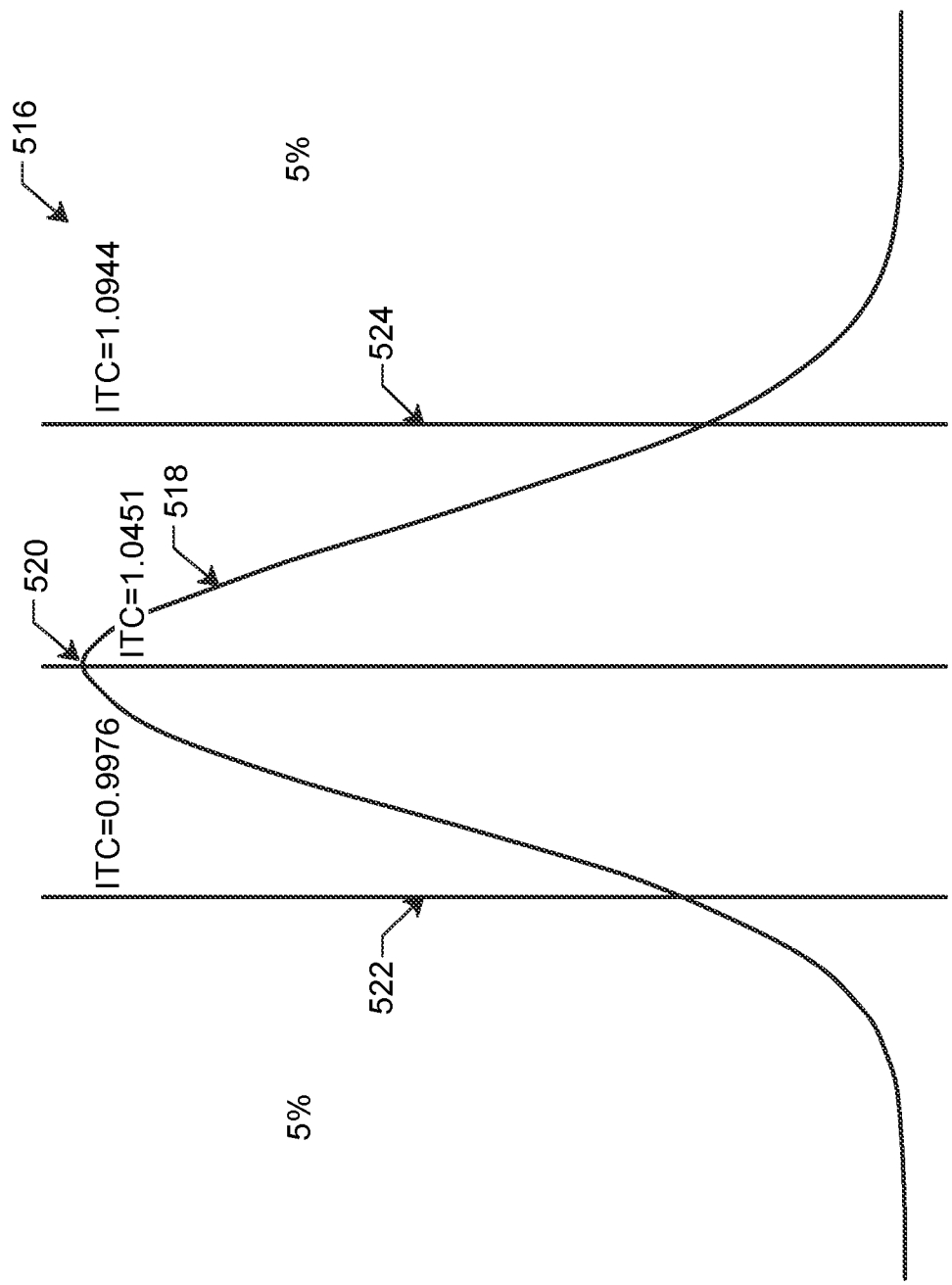

The normal distribution and the control distribution are shown in FIG. 5C. An example of the estimated distribution, generated from the normal distribution and the control distribution, is shown in FIG. 5D.

Step 212 includes selecting, using the expected long term value and the estimated distribution, a selected GUI from among the different GUIs. Recall that the long term values may relate to a measure of success for a given variation of a particular GUI or set of GUIs. For example, if a GUI or set of GUIs are associated with more users continuing use of the software application (e.g., a higher long term value in this example), then an assumption is made that the GUI or set of GUIs with the higher expected long term values are at least partially responsible for the higher user retention rate. Thus, the GUI or the set of GUIs with the most favorable long term values are selected automatically from among the different GUIs.

Step 214 includes modifying the software application by presenting the selected GUI. Presenting the selected GUI may include automatically updating software application to use the selected GUI or set of GUIs. Automatically updating may be performed by overwriting existing code for the software application with new code, by adding software modules, or by some other technique. Presenting the selected GUI may also include showing the selected GUI or set of GUIs to a user, such as a software engineer or a company executive, for confirmation that the selection is to be updated. Presenting the selected GUI may also include storing the selected GUI or set of GUIs in a data repository. Presenting the selected GUI may take the form of other computer-implemented actions with respect to the selected GUI or set of GUIs.

While the method of FIG. 2 is presented in the context of modifying a GUI or set of GUIs of a software application the one or more embodiments contemplate that other aspects of a software application can be improved automatically. For example, the expected long term value and estimated distribution of long term values generated between steps 200 and 210 may relate to the functionality of a software application, such as a new command executable by the software application at the request of a user. Thus, the one or more embodiments are not necessarily limited to the context of improving a GUI of a software application, but may also be applied to other aspects of automated software improvement.

The method of FIG. 2 may be further extended and/or modified. For example, prior to mapping at step 202, the method may also include creating the lookalike cohorts by grouping the new population of users according to a measure of similar features that apply to long term users of the software application. In another example, prior to mapping at step 202, the method may also include creating the lookalike cohorts by applying a categorization algorithm to segments and attributes of long term users of the software application. In other words, the method of FIG. 2 may include generating the lookalike cohorts instead of assuming their existence for use in the method of FIG. 2.

Other variations possible. For example, as with the above variation, the method may include creating, prior to mapping, the lookalike cohorts by grouping the new population of users according to a measure of similar features that apply to long term users of the software application. The method may also include generating, prior to mapping, baseline data for the lookalike cohorts by generating past long term values of the long term users (e.g., as shown in Step 302 of FIG. 3). Then, selecting the expected long term value from the normal distribution at step 208 may further include using the baseline data when selecting the expected long term value.

Still other variations or additions to the method of FIG. 2 are possible. For example, the method may include collecting, after generating the estimated distribution, retention data on the new population. The method then includes adjusting, before modifying the software application, the estimated distribution by adding the retention data to the new population to generate a second distribution. The method then includes generating, using a second random sampling algorithm, a second normal distribution from the second distribution. The method then includes selecting a second expected value from the second normal distribution. The method then includes generating, from the second normal distribution, a second estimated distribution of estimated long-term values for the new population. In the current example, selecting at step 208 further includes selecting using the second estimated distribution of estimated long-term values for the new population.

In another variation, the method of FIG. 2 also includes creating, by generating a feedback loop, an updated estimated distribution of estimated long-term values for the new population. In the current example, selecting at step 208 further includes selecting using the updated estimated distribution of estimated long-term values for the new population.

The method of FIG. 2 may be more detailed. For example, the method may include creating, prior to mapping at step 202, the lookalike cohorts by grouping the new population of users according to a measure of similar features that apply to long term users of the software application. Then, prior to mapping, baseline data is generated for the lookalike cohorts by generating past long term values of the long term users. After generating the estimated distribution, retention data is collected on the new population. Before selecting the selected GUI, the estimated distribution is adjusted by adding the retention data to the new population to generate a second distribution. Using a second random sampling algorithm, a second normal distribution is generated from the second distribution. A second expected value is selected from the second normal distribution.

The method then includes generating a first comparison by comparing the retention data to the baseline data. The first comparison may be referred-to as a "worst case" scenario. The worst case scenario is the lowest long term value change expected as a result of implementing the proposed software update. However, the method also includes generating a second comparison by comparing the retention data to the second expected value. The second comparison may be referred-to as a "best case" scenario. The best case scenario is the highest long term value change expected as a result of implementing the proposed software update. A range is generated by comparing the first comparison (worst case scenario) to the second comparison (best case scenario).

In the current example, selecting at step 212 is further based on the range. For example, if the range is narrower, then the prediction is deemed to be more accurate relative to a range generated for some other proposed update to the software application. Accuracy may be deemed more important, in some cases, than the overall expected long term values for the two proposed updates. However, a greater range may indicate that further experimentation is useful by gathering additional data at step 200 and then repeating the method of FIG. 2. In either case, or taking some other action based on the range, the selecting at step 212 is further based on the range.

Attention is now turned to FIG. 3. The method of FIG. 3 is a variation of the method of FIG. 2. In particular, FIG. 3 includes additional steps, as well as additional details regarding specific implementation methods for step 202 through step 210. However, FIG. 3 is applied in a more general sense to update the software application, rather than only in the context of updating a GUI of the software application.

Step 300 includes creating lookalike cohorts with distinct segments and attributes from a historical existing population of users of a software application. The lookalike cohorts may be created in a manner similar to that described with respect to step 202 of FIG. 2.

As described above, a cohort is a group of users that have similar long term values. The distribution of long term values within the cohort is approximately a normal distribution, which means the distribution is a bell shape centered around average value. In the current example, a point estimator can be used for the cohort value.

Also as described above, the lookalike cohort is the group of users with a similar feature set relative to an existing cohort of existing users. A normal distribution of long term values is then generated from each of the cohorts based on historical data. New users are mapped to one of the lookalike cohorts based on their features, and their long term values are assumed to fall within the normal distribution of the lookalike cohorts for the next steps.

A lookalike cohort may be generated by first performing a chi-square test through all the users features in order to test for homogeneity and determine the appropriate features to use for the clustering and creation of the lookalike cohorts. The segments and attributes refer to the features of the individuals.

Other methods may be used to create lookalike cohorts with distinct segments and attributes from the historical existing population. For example, a categorization algorithm or machine learning model may be used to create the lookalike cohorts, as long as the lookalike cohort values can be summarized with an inference value.

Step 302 includes generating baseline data for the lookalike cohorts. The baseline for a lookalike cohort is a determination of past long term values from past users (e.g., long term users). The determination of the past long term values from past users may be performed using a regression model, an averaging process, or some other process for determining the past long term values of past users. In a specific example, a lookback range of historical data may be used to generate average data, or as the input to a regression model, for generating the baseline data of past long term values.

Step 304 includes mapping new user populations to the lookalike cohorts and drawing a distribution with the Dirichlet distribution. Based on the set of features used to identify a lookalike cohort, a decision can be made regarding into which lookalike cohort a new population will fall. An example of sorting the lookalike cohorts is shown in FIG. 5A. Drawing sample from the distribution of new users (i.e., the distribution of the new users to the lookalike cohorts) probabilities are generated for each cohort of all draws. The distribution may be a Dirichlet distribution. An example of the drawn distribution using the Dirichlet distribution is shown in FIG. 5B.

Step 306 includes running a Monte Carlo simulation on the drawn distribution to create an expected value. A Monte Carlo simulation is a statistical technique by which a quantity is calculated repeatedly, using randomly selected scenarios for each calculation. The results of the Monte Carlo simulation are a range of results, which has a peak that is used as the expected value.

According to The Central Limit Theorem, if a sufficiently large number of random samples is taken from the population with replacement, then the distribution of the sample will be approximately normally distributed. By using a Monte Carlo simulation, a sufficiently large number of random samples is drawn. Accordingly, the long term value estimate forms a normal distribution of long term values.

Thus, the expected value is a single number, taken from the normal distribution generated from sampling that reflects a most likely long term value. The normal distribution can give confidence interval (i.e., a range) of long term values. In other words, after running the Monte Carlo simulation, a normal distribution of long term value is generated.

For example, the expected value generates may be a long term value per visitor (e.g., user). The long term value per visitor is equal to the total long term value divided by the total number of visitors.

Thus, the one or more embodiments gather information on the unit count of each lookalike cohort for each cell in the probability table (see, e.g., FIG. 5B). A control group of past users is established: Control: [Cohort-0 unit, Cohort-1 unit, Cohort-2 unit, Cohort-3 unit, . . . , Cohort-N unit]. A treatment unit of new users is established: Treatment: [Cohort-0 unit, Cohort-1 unit, Cohort-2 unit, Cohort-3 unit, . . . , Cohort-N unit].

The Dirichlet distribution is used to generate the probability to choose each option 'pi' that falls into the "i-th" cohort. The Control Dirichlet distribution is: Control: [p0, p1, p2, p3, . . . , pN]. The Treatment Dirichlet distribution is: Treatment: [p0, p1, p2, p3, . . . , pN]. The long term value (LTV) for each cohort is [Cohort-0 LTV, Cohort-1 LTV, Cohort-2 LTV, Cohort-3 LTV, . . . , Cohort-N LTV]. The LTV per visitor=SUM(p i*ltv i).

The simulation is performed M times to reach desired margin of error. The desired margin of error is the margin of error planned between the sampled LTV and the true population LTV. Thus, the Control is [LTV/visitor 1,LTV/visitor 2, LTV/visitor 3, . . . , LTV/visitor M] and the Treatment: [LTV/visitor 1,LTV/visitor 2, LTV/visitor 3, . . . , LTV/visitor M]. The simulated results are compared to each other.

Step 308 includes providing ranged recommendations with a quantified confidence level based on the distribution of the expected value. The ranged recommendations are provided by comparing the simulated long term value for new users to the control long term value for existing users. By comparing the distribution, an index to control distribution is generated. See, for example, FIG. 5C and FIG. 5D. In particular, a percentage, X, of the samples fall outside of the selected deviation about the expected long term value. Some of the samples may have a probability that exceeds 100% (i.e., the predicted long term value is greater than the control long term value). Thus, 1-X is the confidence percentage that the treatment index to control will be within a range, where the range may exceed 100%. By checking the percentage of samples that fall above 100%, a probability, P, is generated that the predicted long term value expected for the proposed software update will exceed the current long term value of existing software users. Knowing P, an automatic decision can be made whether to automatically update the software.

Step 310 includes adjusting the lookalike cohort values with a Markov Chain Monte Carlo (MCMC) modeling algorithm after collecting retention data. Step 310 is a step that improves the ranged recommendation made at step 308. In particular, as time goes on updated retention data regarding the new users may be evaluated.

Retention data is data collected from the new users' behavior. In the beginning of the method, an assumption was made that the new population will look like the old population when steps 306 and 308 were performed, because retention data for the test sample was not available at that time. As time goes by, retention data is collected for the test/control group (the new users). The retention data can be used to check if the lookalike cohort LTV value has changed. If the retention rate is different from historical data for the lookalike cohort, then the LTV assumption for the lookalike cohort is adjusted, and steps 306 and 308 are repeated to provide new recommendations.

The MCMC method is used to fit the retention curves of the baseline lookalike cohort and the new lookalike cohort generated from sample. The difference is compared, and the cohort LTV is adjusted based on how the retention curve changed, if the change is statistically significant. The adjusted lookalike cohort value itself is a single value. The adjusted lookalike cohort value is used to feed back into step 306 and step 308 to give new recommendations.

Thus, at step 312, a feedback loop is established to update the expected value distribution and comparison. The feedback loop continues between step 306 and step 312 until a termination condition exists. The termination condition may be expiration of a pre-determined time has expired, a command to terminate the feedback loop, a convergence of changes (to the expected LTV value and associated LTV range) below a minimum threshold change, or some other termination condition.

At step 314, a worst case scenario and a best case scenario are provided. The worst case scenario and the best case scenario come from the retention data after the feedback loop at step 312 is completed. Different assumptions can be made based on the retention data gathered. For example, an assumption can be made that the new population cohort retains the same as historical LTV, and if better retention is seen, an adjusted cohort value can be generated. In the current example, the results of step 306 and step 308 using the baseline lookalike cohort value is the worst case scenario, and the results of step 306 and step 308 with the adjusted cohort value (higher LTV because of the improved retention) is a best case scenario. The difference between the worst case scenario and the best case scenario can be used as a basis to take further action, such as at step 316.

At step 316, the software program is automatically modified using the worst case scenario and best case scenario. For example, if the difference between the worst case scenario and best case scenario falls within a pre-defined threshold range, then a selected update to the software application is automatically implemented. Accordingly, the worst case scenario and the best case scenario provide information desirable for making a risk management decision with respect to selecting which update to the software application to use.

Thus, the framework of the one or more embodiments programmatically fits new populations of users into lookalike cohorts (having unknown long term values) that are comparable to historic cohorts (having known long term values). A distribution of expected long term values is extrapolated from the lookalike cohorts. The extrapolation is then run through simulations to analyze for early results to long term value estimations for multiple possible updates to a software application. A feedback loop may be used to update the extrapolation as more long term value data becomes actualized for new users. Accordingly, the one or more embodiments enables an automated process or a decision maker to quantify risks and benefits (among multiple choices for a software application update) as early as possible.

While the various steps in the flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

Figure 4:
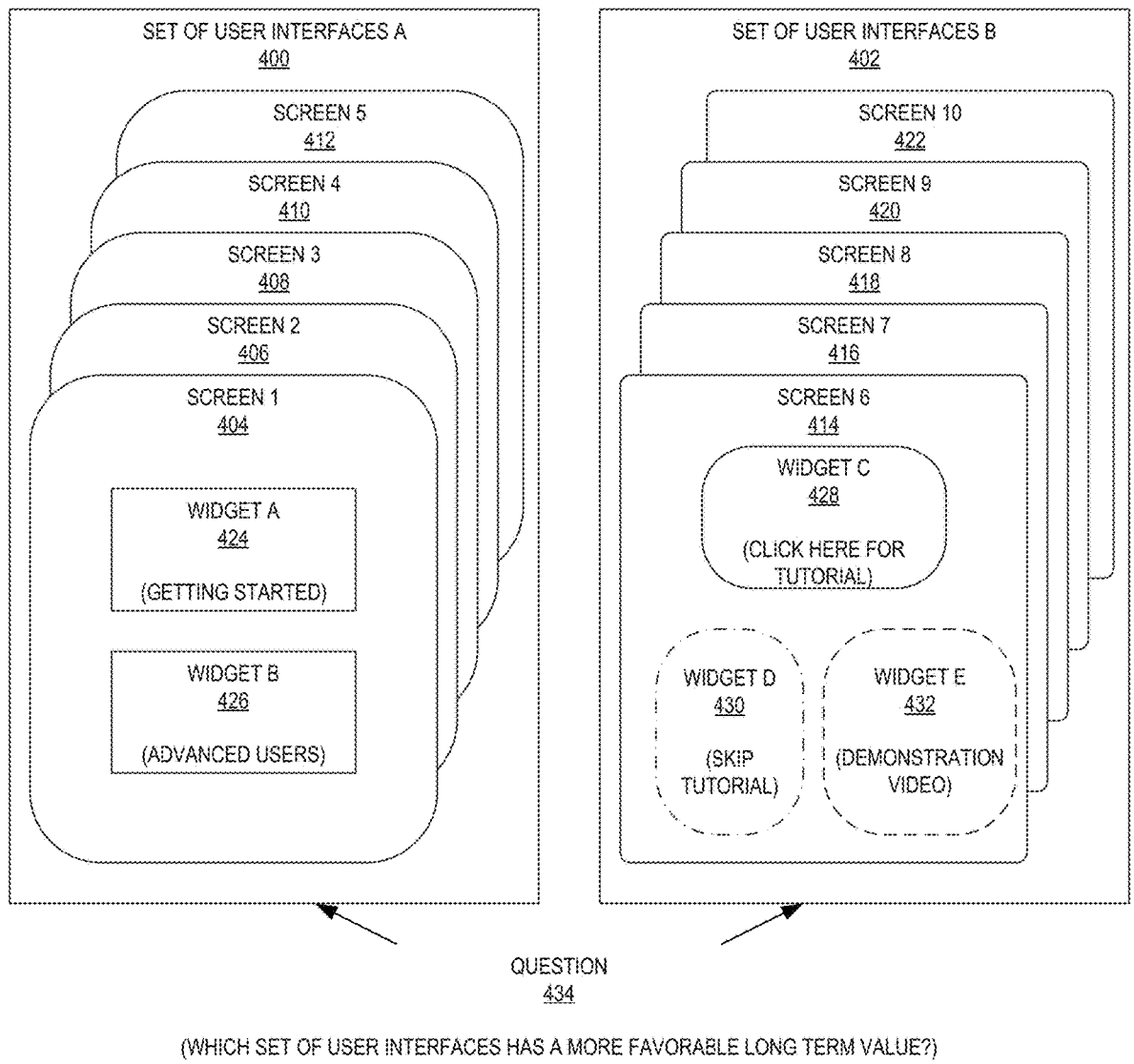
FIG. 4 shows an example of using the methods shown in FIG. 2 and FIG. 3 to modify a software application, in accordance with one or more embodiments.

FIG. 4 through FIG. 5D present a specific example of the techniques described above with respect to FIG. 1 through FIG. 3. In particular, FIG. 4 shows an example of using the methods shown in FIG. 2 and FIG. 3 to modify a software application, in accordance with one or more embodiments. FIG. 5A through FIG. 5D show additional examples of using the methods of FIG. 2 and FIG. 3, as applied to the example shown in FIG. 4, in accordance with one or more embodiments. The following example is for explanatory purposes only and not intended to limit the scope of the one or more embodiments.

FIG. 4 shows two sets of user interfaces for a software application: set of user interfaces A (400) and set of user interfaces B (402). A decision maker at a software company desires to know which set of user interfaces should be chosen for long-term implementation with respect to the software program. In the current example, A/B testing is performed to answer a question (434): "which set of user interfaces has a more favorable long term value?" Thus, "beta" versions of both sets of user interfaces are presented to selected new users and user data is collected and tracked for both the set of user interfaces A (400) and the set of user interfaces B (402).

The set of user interfaces A (400) includes five screens: screen 1 (404), screen 2 (406), screen 3 (408), screen 4 (410), and screen 5 (412). Each screen has one or more widgets or displays information in a certain manner that has a pre-defined look and feel. A widget is a tool a user can use to interact with the software application, such as a button, a drop down menu, a command, a scroll bar, a wheel, etc. that is graphically represented on one or more of the screens. In the current example, screen 1 (404) has two widgets: widget A (424) and widget B (426). Widget A (424) is a "getting started" button that prompts a new user to begin the process of starting to use the software application. Widget B (426) is a "advanced users" button that skips several steps for users that are already familiar with using the software application.

The set of user interfaces B (402) also includes five screens: screen 6 (414), screen 7 (416), screen 8 (418), screen 9 (420), and screen 10 (422). The screens in the set of user interfaces B (402) may contain the same or different widgets or functionality, and may have a different look and feel. For purposes of distinguishing the two sets of user interfaces, the set of user interfaces B (402) has three widgets in the screen 6 (414): widget C (428) ("click here for tutorial"), widget D (430) ("skip tutorial"), and widget E (432) (a demonstration video of the software application in use).

The functionalities of the screen 1 (404) and the screen 6 (414) are similar: To present new users with an opportunity for extra support, but to allow advanced or experienced users to skip information or steps they do not want or need. However, the widgets, language, and look and feel of the two screens are different. The other screens in the set of user interfaces A (400) and the set of user interfaces B (402) may have the same or different functionalities, look and feel, and/or information displayed.

In order to minimize the testing time in performing A/B testing to answer the question (434), the method of FIG. 2 or FIG. 3 is applied to the data tracked with respect to new users of the set of user interfaces A (400) and new users of the set of user interfaces B (402). Thus, attention is now turned to FIG. 5A.

FIG. 5A shows an example sorting a population of new users of the set of user interfaces A (400) in FIG. 4 into lookalike cohorts, as reflected in table (500). A separate table (not shown) would be generated for the population of new users of the set of user interfaces B (402), as the method of FIG. 2 would be applied separately to each set of new users.

In the example of FIG. 5A, there are three lookalike cohorts: Lookalike Cohort 1, Lookalike Cohort 2, and Lookalike Cohort 3. Using the procedures described with respect step 202 of FIG. 2, the new population of users is distributed into the three lookalike cohorts, as shown in table (500). In the current example, 20 new users are placed in Lookalike Cohort 1, 40 users are placed in Lookalike Cohort 2, and 90 users are placed in Lookalike Cohort 3.

FIG. 5B shows a table (502) of five samples extracted from the distribution shown in the table (500) of FIG. 5A. The table (502) in FIG. 5B is generated using a Monte Carlo algorithm and the procedures described with respect to step 204 of FIG. 2. Thus, for example, Sample 1 in table (502) shows that the probability that a randomly selected new user from the new population of users has a 0.13546494 probability of being in Lookalike Cohort 1, a 0.31278485 probability of being in Lookalike Cohort 2, and a 0.55175021 probability of being in Lookalike Cohort 3. Four additional samples are also extracted using the procedures described in step 204 of FIG. 2.

FIG. 5C shows a graph (504) of density of new users (on the Y-axis (506)) versus long term value per visitor (on the X-axis (508)). Line (510) shows the control distribution for long term values associated with a control group of existing users of the existing software. Line (512) shows the normal distribution of long term values predicted for the new group of users that used the proposed software application update (the software version that uses the set of user interfaces A (400) in FIG. 4). The line (512) (the normal distribution generated from the samples in the table (502) shown in FIG. 5B) is generated using the procedures described with respect to step 206 of FIG. 2. The expected long term value for the set of user interfaces A (400) in FIG. 4 is the LTV per visitor at the peak value (514) of the line (512).

However, also of interest is the expected distribution of estimated long term values for the new population. As described above, the expected distribution is a measure of the expected increase or decrease in long term values predicted if the set of user interfaces A (400) of FIG. 4 is implemented for the software application.

FIG. 5D shows a graph (516) that demonstrates the expected distribution of long term values about the expected long term value for the set of user interfaces A (400) in FIG. 4. The line (518) is generated using the procedures described with respect to step 210 in FIG. 2 (e.g., by comparing the normal distribution (line (512) in FIG. 5C) to the control distribution (line (510) in FIG. 5C). The maximum (520) of the line (518) corresponds to expected long term value (i.e., the peak value (514) in FIG. 5C), assuming that the set of user interfaces A (400) in FIG. 4 is implemented. In the example of FIG. 5D, the maximum (520) in line (518) is 1.0451, reflecting an expected 4.5 percent increase in long term values if the set of user interfaces A (400) in FIG. 4 are implemented, relative to continuing use of the existing set of GUIs for the software application.

The estimated distribution of long term values for the new population is selected to be the distribution that corresponds to 90% of the new users (roughly two standard deviations). In the example of FIG. 5D, the estimated distribution of long term values is the range of values along the line (518) between border (522) and border (524). The border (522) shows a value of 0.9976, reflecting a 0.034 percent decrease in long term values if the new software version is adopted, with only 5% of new users predicted to have lower improvements to long term values. The border (524) shows a value of 1.0944, reflecting a 9.44 percent increase in long term values if the new software version is adopted, with only 5% of new users predicted to have higher improvements to long term values. Thus, the estimated distribution of long term values for the new population of users that used the set of user interfaces A (400) in FIG. 4 is the range of values between 0.9976 and 1.0944. Stated differently, there is a 90 percent confidence that the treatment index to control would be 99.76% to 109.44%. By checking the percentage of the sample that falls above 100%, a prediction is made whether the estimated long term values are predicted to beat the control long term values.

A similar procedure is performed with respect to the set of user interfaces B (402) of FIG. 2. However, that procedure is omitted from the example for the sake of clarity.

The expected long term value and estimated distribution of long term values for the set of user interfaces A (400) of FIG. 4 is then compared to the expected long term value and the estimated distribution of long term values for the set of user interfaces B (402) of FIG. 4. A quality measure is then used to select between the set of user interfaces A (400) and the set of user interfaces B (402) of FIG. 4. The quality measure may be the highest expected long term value. The quality measure may be the smallest range of estimated distributions of long term values. The quality measure may be a combination of the expected long term value and the estimated distributions of long term values.

In the example of FIG. 4 through FIG. 5D, the quality measure selected indicates that the set of user interfaces A (400) of FIG. 4 is predicted to have a more favorable long term value, relative to the set of user interfaces B (402). Thus, the answer to the question (434) (which set of user interfaces has a more favorable long term value) is the set of user interfaces A (400). Accordingly, in the example of FIG. 4 through FIG. 5D, the set of user interfaces A (400) is automatically implemented as an update to the software application.

While the example of FIG. 4 through FIG. 5D are presented in the context of automatically updating software and/or GUIs, the procedures described with respect to FIG. 1 through FIG. 3 may have other applications. For example, the procedures described with respect to FIG. 1 through FIG. 3 may be used to more quickly estimate long term values in automated business systems, enterprise systems, hardware updates, etc. For example, a potential hardware design change may be the thing being tested, in which case the long term values being estimated could be mean lifetime of the hardware, sales of the hardware, interoperability issues with the hardware, etc. Thus, the one or more embodiments are not necessarily limited to updating software automatically.

Figure 6A:
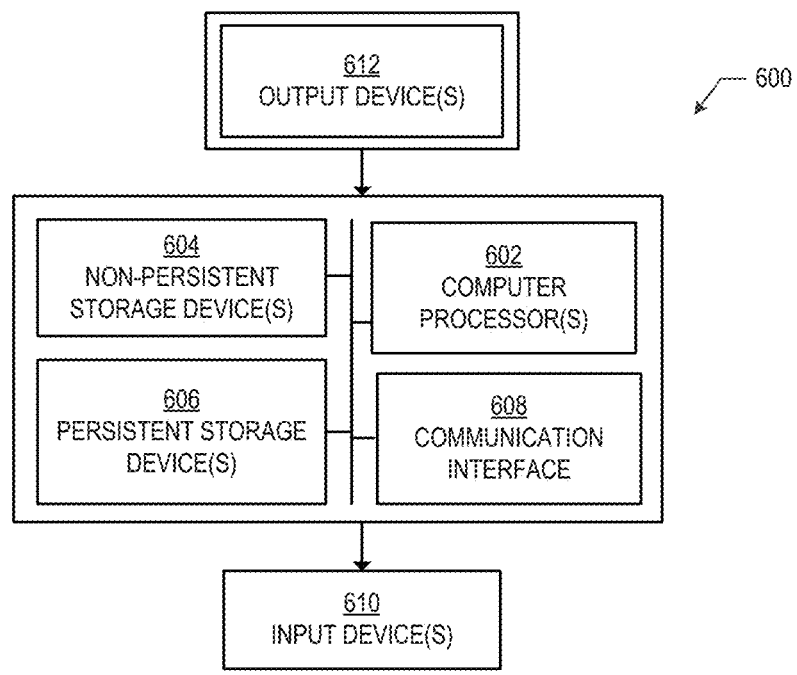
FIG. 6A and FIG. 6B show computing systems and a network environment, in accordance with one or more embodiments.
Figure 6B:
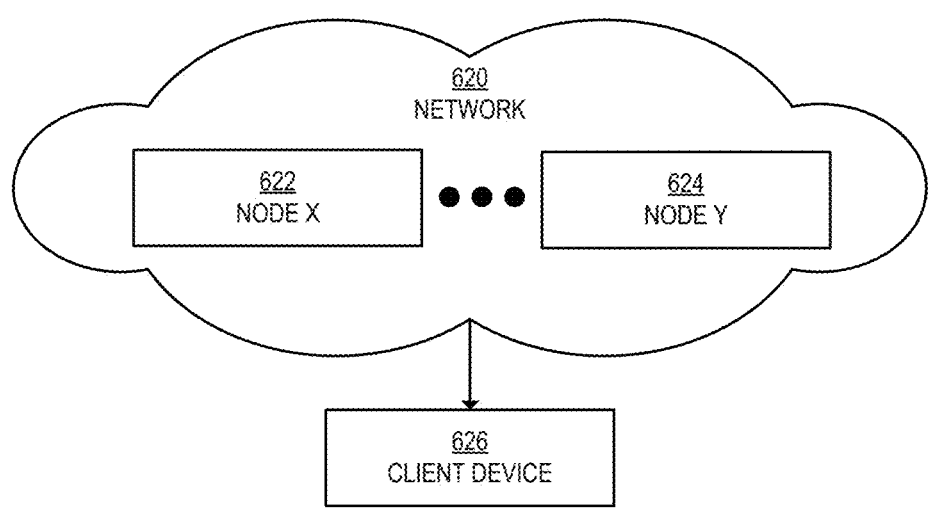

FIG. 6A and FIG. 6B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processor(s) (602), non-persistent storage device(s) (604) (e.g., volatile memory, such as random access memory (RAM), cache memory), persistent storage device(s) (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), and numerous other elements and functionalities that implement the features and elements of the disclosure.

The computer processor(s) (602) may be an integrated circuit for processing instructions. For example, the computer processor(s) (602) may be one or more cores or micro-cores of a processor. The computing system (600) may also include one or more input device(s) (610), such as a touchscreen, a keyboard, a mouse, a microphone, a touchpad, an electronic pen, or any other type of input device.

The communication interface (608) may include an integrated circuit for connecting the computing system (600) to a network (not shown) (e.g., a local area network (LAN), a wide area network (WAN) such as the Internet, a mobile network, or any other type of network) and/or to another device, such as another computing device.

Further, the computing system (600) may include one or more output device(s) (612), such as a screen (e.g., a liquid crystal display (LCD), a plasma display, a touchscreen, a cathode ray tube (CRT) monitor, a projector, or other display device), a printer, an external storage, or any other output device. One or more of the output device(s) (612) may be the same or different from the input device(s) (610). The input and output device(s) (610 and 612) may be locally or remotely connected to the computer processor(s) (602), the non-persistent storage device(s) (604), and the persistent storage device(s) (606). Many different types of computing systems exist, and the aforementioned input and output device(s) (610 and 612) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system (600) shown in FIG. 6A, or a group of nodes combined may correspond to the computing system (600) shown in FIG. 6A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system (600) shown in FIG. 6A. Further, the client device (626) may include and/or perform all or a portion of the one or more embodiments.

The computing system (600) or group of computing systems described in FIG. 6A and FIG. 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (600) in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (600) of FIG. 6A, while performing the one or more embodiments, may perform data comparison. Data comparison may be used to compare two or more data values (e.g., A, B). For example, one or more embodiments may determine whether $A>B$, $A=B$, $A \mathrel{!}= B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (600) in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (600) of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (600) of FIG. 6A and the nodes (e.g., node X (622), node Y (624)) and/or client device (626) in FIG. 6B. Other functions may be performed using one or more embodiments.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities. An entity is an electronic device, not necessarily limited to a computer.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A computer-implemented method comprising:
    obtaining user data describing a new population of users of a software application comprising a plurality of different graphical user interfaces (GUIs), wherein the user data includes new graphical user interface (GUI) usage data generated by the new population of users;
    sorting the new population of users into a plurality of lookalike cohorts comprising a lookalike cohort, wherein the lookalike cohort is similar to an existing cohort of a plurality of existing cohorts of a long-term user population of the software application, by:
        obtaining a plurality of features characterizing existing GUI usage data corresponding to the long-term user population,
        training an unsupervised machine learning model with the plurality of features to generate an output vector corresponding to an input to the unsupervised machine learning model, wherein the output vector is a vector of probabilities of the input being associated with the plurality of existing cohorts,
        obtaining an input instance corresponding to a new user from the new population of users, wherein the input instance is a set of feature values corresponding to the new user based on the new GUI usage data,
        inputting the input instance to the trained unsupervised machine learning model to obtain a new output vector corresponding to the new user, and
        adding the new user to the lookalike cohort of the plurality of lookalike cohorts, wherein the lookalike cohort is assigned a long-term value similar to the existing cohort of the plurality of existing cohorts that the new user is most likely associated with based on a highest probability value of the new output vector;
    generating a distribution of the plurality of lookalike cohorts;
    extracting, using a random sampling algorithm, a plurality of samples from the distribution;
    generating, from the plurality of samples, a normal distribution of predicted long term values of the new population of users;
    selecting an expected long term value from the normal distribution;
    generating, from the normal distribution, an estimated distribution, around the expected long term value, of estimated long-term values for the new population of users;
    collecting, after generating the estimated distribution, at least retention data on the new population of users;
    adjusting, before modifying the software application, the estimated distribution by adding the retention data to the new population of users to generate a second distribution;
    generating, using a second random sampling algorithm, a second normal distribution from the second distribution;
    selecting a second expected value from the second normal distribution;
    generating, from the second normal distribution, a second estimated distribution of estimated long-term values for the new population of users,
        wherein selecting further comprises selecting using the second estimated distribution of estimated long-term values for the new population of users;
    selecting, using the expected long term value and the estimated distribution, a selected GUI from among the plurality of different GUIs; and
    modifying the software application by presenting the selected GUI.

2. The method of claim 1, further comprising:
    creating, prior to generating the distribution, the plurality of lookalike cohorts by grouping the new population of users according to a measure of similar features that apply to long term users of the software application.

3. The method of claim 1, further comprising:
creating, prior to generating the distribution, the plurality of lookalike cohorts by applying a categorization algorithm to segments and attributes of long-term users of the software application.

4. The method of claim 1, further comprising:
creating, prior to generating the distribution, the plurality of lookalike cohorts by grouping the new population of users according to a measure of similar features that apply to long term users of the software application;
generating, prior to mapping, baseline data for the plurality of lookalike cohorts by generating past long term values of the long term users; and
wherein selecting the expected long term value from the normal distribution further comprises using the baseline data when selecting the expected long term value.

5. The method of claim 1, further comprising:
creating, by generating a feedback loop, an updated estimated distribution of estimated long-term values for the new population; and
wherein selecting further comprises selecting using the updated estimated distribution of estimated long-term values for the new population.

6. The method of claim 1, further comprising:
creating, prior to generating the distribution, the plurality of lookalike cohorts by grouping the new population of users according to a measure of similar features that apply to long term users of the software application;
generating, prior to mapping, baseline data for the plurality of lookalike cohorts by generating past long term values of the long term users;
generating a first comparison by comparing the at least retention data to the baseline data;
generating a second comparison by comparing the at least retention data to the second expected value;
generating a range by comparing the first comparison to the second comparison; and wherein selecting further comprises selecting based on the range.

7. The method of claim 1, wherein tracking the new population of users comprises tracking graphical user interface (GUI) usage data generated by the new population of users.

8. The method of claim 1, wherein the plurality of lookalike cohorts is comparable to groups of long term populations of users of the software application, the groups of long term populations of users having stored long term values of prior GUI usage data of the software application.

9. The method of claim 1, wherein the plurality of samples comprises probabilities that a selected user in the new population is a member of a selected one of the plurality of lookalike cohorts.

10. A system comprising:
a server comprising a processor;
a software application comprising a plurality of different graphical user interfaces (GUIs);
a non-transitory computer readable storage medium in communication with the processor and storing:
a random sampling algorithm,
computer readable program code,
user data describing a new population of users of the software application including new GUI usage data generated by the new population of users,
a distribution comprising the new population of users distributed into a plurality of lookalike cohorts,
a plurality of samples drawn from the distribution,
a normal distribution of predicted long term values of the new population of users,
an expected long term value,
an estimated distribution, of estimated long-term values for the new population of users, around the expected long term value, and a selected GUI in the plurality of different GUIs;
a long term value generator configured, when executed by the processor, to:
sort the new population of users into the plurality of lookalike cohorts comprising a lookalike cohort, wherein the lookalike cohort is similar to an existing cohort of a plurality of existing cohorts of a long-term user population of the software application, by:
obtaining a plurality of features corresponding to the long-term user population characterizing existing GUI usage data corresponding to the long-term user population,
training an unsupervised machine learning model with the plurality of features to generate an output vector corresponding to an input to the unsupervised machine learning model, wherein the output vector is a vector of probabilities of the input being associated with the plurality of existing cohorts,
obtaining an input instance corresponding to a new user from the new population of users, wherein the input instance is a set of feature values corresponding to the new user based on the new GUI usage data,
inputting the input instance to the trained unsupervised machine learning model to obtain a new output vector corresponding to the new user, and
adding the new user to the lookalike cohort of the plurality of lookalike cohorts, wherein the lookalike cohort is assigned a long-term value similar to the existing cohort of the plurality of existing cohorts that the new user is most likely associated with based on a highest probability value of the new output vector;
generate the distribution of the plurality of lookalike cohorts,
extract, using the random sampling algorithm, the plurality of samples from the distribution,
generate, from the plurality of samples, the normal distribution of predicted long term values,
select the expected long term value from the normal distribution, and generate, from the normal distribution, the estimated distribution around the expected long term value;
collect, after generating the estimated distribution, at least retention data on the new population of users;
adjust, before modifying the software application, the estimated distribution by adding the at least retention data to the new population of users to generate a second distribution;
generate, using a second random sampling algorithm, a second normal distribution from the second distribution;
select a second expected value from the second normal distribution;
generate, from the second normal distribution, a second estimated distribution of estimated long-term values for the new population of users, wherein selecting further comprises selecting using the second estimated distribution of estimated long-term values for the new population of users; and
a user interface selector configured, when executed by the processor, to:
select, using the expected long term value and the estimated distribution, the selected GUI, and
modify the software application by presenting the selected GUI.

11. The system of claim 10, wherein the long term value generator is further configured to:
create, prior to generating the distribution, the plurality of lookalike cohorts by grouping the new population of users according to a measure of similar features that apply to long term users of the software application.

12. The system of claim 10, wherein the long term value generator is further configured to:
create, prior to generating the distribution, the plurality of lookalike cohorts by applying a categorization algorithm to segments and attributes of long term users of the software application.

13. The system of claim 10, wherein the long term value generator is further configured to:
create, prior to generating the distribution, the plurality of lookalike cohorts by grouping the new population of users according to a measure of similar features that apply to long term users of the software application;
generate, prior to mapping, baseline data for the plurality of lookalike cohorts by generating past long term values of the long term users; and
wherein selecting the expected long term value from the normal distribution further comprises using the baseline data when selecting the expected long term value.

14. The system of claim 10, wherein the long term value generator is further configured to:
create, by generating a feedback loop, an updated estimated distribution of estimated long-term values for the new population; and
wherein selecting further comprises selecting using the updated estimated distribution of estimated long-term values for the new population.

15. The system of claim 10, wherein the long-term value generator is further configured to:
create, prior to generating the distribution, the plurality of lookalike cohorts by grouping the new population of users according to a measure of similar features that apply to long term users of the software application;
generate, prior to mapping, baseline data for the plurality of lookalike cohorts by generating past long term values of the long term users;
generate a first comparison by comparing the at least retention data to the baseline data;
generate a second comparison by comparing the at least retention data to the second expected value;
generate a range by comparing the first comparison to the second comparison; and
wherein selecting further comprises selecting based on the range.

16. The system of claim 10, wherein the plurality of lookalike cohorts are comparable to groups of long term populations of users of the software application, the groups of long term populations of users having stored long term values of prior GUI usage data of the software application.

17. The system of claim 10, wherein the plurality of samples comprises probabilities that a selected user in the new population is a member of a selected one of the plurality of lookalike cohorts.

18. A non-transitory computer readable storage medium storing computer readable program code which, when executed by a processor, performs computer-implemented method comprising:
obtaining user data describing a new population of users of a software application comprising a plurality of different graphical user interfaces (GUIs), wherein the user data includes new graphical user interface (GUI) usage data generated by the new population of users;
sorting the new population of users into a plurality of lookalike cohorts comprising a lookalike cohort, wherein the lookalike cohort is similar to an existing cohort of a plurality of existing cohorts of a long-term user population of the software application, by:
obtaining a plurality of features characterizing existing GUI usage data corresponding to the long-term user population,
training an unsupervised machine learning model with the plurality of features to generate an output vector corresponding to an input to the unsupervised machine learning model, wherein the output vector is a vector of probabilities of the input being associated with the plurality of existing cohorts,
obtaining an input instance corresponding to a new user from the new population of users, wherein the input instance is a set of feature values corresponding to the new user based on the new GUI usage data,
inputting the input instance to the trained unsupervised machine learning model to obtain a new output vector corresponding to the new user, and
adding the new user to the lookalike cohort of the plurality of lookalike cohorts, wherein the lookalike cohort is assigned a long-term value similar to the existing cohort of the plurality of existing cohorts that the new user is most likely associated with based on a highest probability value of the new output vector;
generating a distribution of the plurality of lookalike cohorts;
extracting, using a random sampling algorithm, a plurality of samples from the distribution;
generating, from the plurality of samples, a normal distribution of predicted long term values of the new population of users;
selecting an expected long term value from the normal distribution;
generating, from the normal distribution, an estimated distribution, around the expected long term value, of estimated long-term values for the new population of users;
collecting, after generating the estimated distribution, at least retention data on the new population of users;
adjusting, before modifying the software application, the estimated distribution by adding the retention data to the new population to generate a second distribution;
generating, using a second random sampling algorithm, a second normal distribution from the second distribution;
selecting a second expected value from the second normal distribution;
generating, from the second normal distribution, a second estimated distribution of estimated long-term values for the new population of users,
wherein selecting further comprises selecting using the second estimated distribution of estimated long-term values for the new population of users;

selecting, using the expected long term value and the estimated distribution, a selected GUI from among the plurality of different GUIs; and modifying the software application by presenting the selected GUI.

\* \* \* \* \*